Sept. 11, 1923.
M. J. DVORSHAK
1,467,613
MILK BOTTLE CARRIER AND OPENER
Filed Feb. 27, 1922
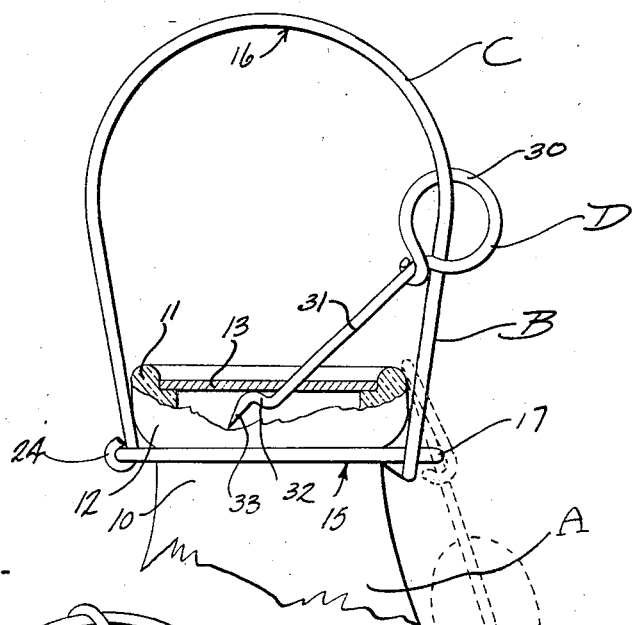
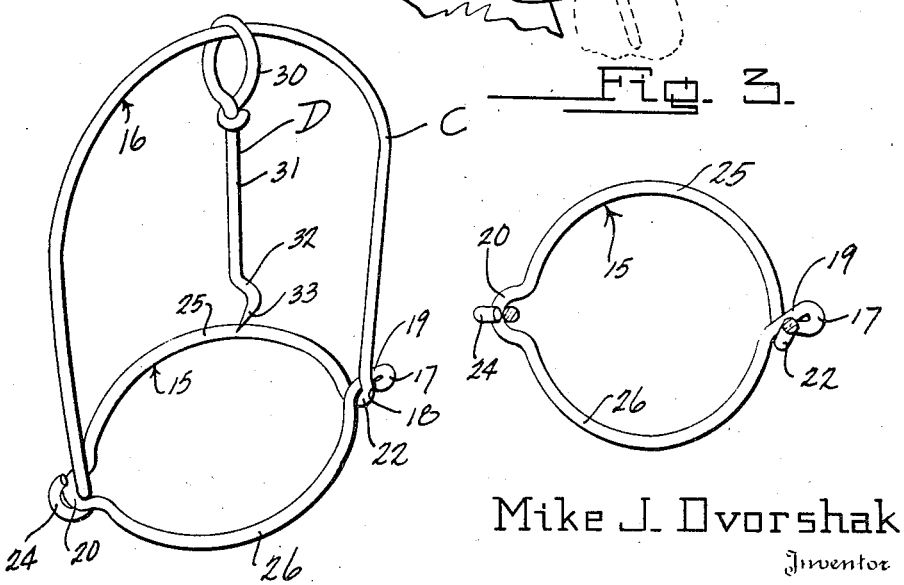
Mike J. Dvorshak
Inventor
By Lancaster and Allwine
Attorneys Patented Sept. 11, 1923.

1,467,613

UNITED STATES PATENT OFFICE.

MIKE J. DVORSHAK, OF EVERETT, WASHINGTON.

MILK-BOTTLE CARRIER AND OPENER.

Application filed February 27, 1922. Serial No. 539,681.

*To all whom it may concern:*

Be it known that I, MIKE J. DVORSHAK, a citizen of the United States, residing at Everett, in the county of Snohomish and State of Washington, have invented certain new and useful Improvements in Milk-Bottle Carriers and Openers, of which the following is a specification.

This invention relates to improvements in bottle carriers.

The primary object of the invention is the provision of a novel type of bottle carrier, having a cap or stopper extracting member mounted thereon and adapted for cooperation therewith in permitting removal of a cap or stopper of the article upon which the bottle carrier is mounted.

A further object of the invention is the provision of a novel type of bottle carrier adapted for detachable engagement about the neck of the ordinary milk bottle for easy transportation of the same.

A further object of the invention is the provision of a novel type of milk bottle cap extracting member.

Other objects and advantages will be apparent during the course of the following detailed description.

In the accompanying drawing, forming a part of this specification, and wherein similar reference characters designate corresponding parts throughout the several views, Figure 1 is a side elevation of the improved bottle carrier and cap extractor, showing the same in operative relation to an ordinary milk bottle.

Figure 2 is a perspective view of the improved bottle carrier and opener.

Figure 3 is a plan view, partly in section, showing details of the improved article carrier.

In the drawing, wherein for the purpose of illustration is shown the preferred embodiment of my invention, the letter A designates an article to be carried, such as an ordinary milk bottle, having the improved bottle carrier and opener B adapted for use in connection therewith, said device B including the bottle carrier portion C, and cap extractor member D.

The bottle A is of the ordinary milk bottle type, although the provision of the milk bottle carrier in connection with other devices to be transported is contemplated, since the same is, of course, susceptible of embodiment in various forms. However, the bottle A comprises the neck portion 10, enlarged head 11 formed upwardly therefrom to provide the shoulder 12, such as found upon ordinary milk bottles. The ordinary type of paper sealing cap or stopper 13 may be provided, inwardly of the top of the head 11, as in the ordinary type of milk bottle.

The article carrier member C is preferably formed of a single strand of resilient wire, bent to provide a neck engaging portion 15, and a bail portion 16. The neck engaging portion 15 is preferably bent in annular manner to provide a split ring having one end thereof provided with an enlarged eye 17 to form an abrupt seating shoulder 18. A relatively straight portion 19 extends for a short distance from the eye 17, from which the arcuation of the neck engaging portion 15 commences. The ring shaped neck portion 15 is crimped in substantually U-shaped manner, diametrically opposite the end 17 of the neck portion, to provide the substantially U-shaped crimp 20 extending outwardly in radial manner, as is clearly illustrated in Figures 2 and 3 of the drawings. The strand of wire, of which the article C is formed, of course, is arcuated, uniformly upon both sides of the crimped portion 20 and is provided with the looped portion 22 upon the other end thereof, which bulges outwardly toward the eyed end 17 of said neck engaging portion 15, and in fact, provides a seat, whereby the eye 17 may be detachably disposed in said looped end 22, and whereby the shoulder portion 18 engages said loop 22 to provide an enclosed ring like neck engaging portion 15.

The bail member 16 is, of course, formed integral with the neck engaging portion 15, since the entire member C is formed of a single strand. In order to effect such construction, the bail member 16 is bent upwardly in a plane substantially at right angles to the plane defined by the neck engaging portion 15, and from the looped end 22; said bail portion 16 providing a substantially U-shaped arrangement, whereby an end 24 thereof is hooked in fixed manner above the outermost portion of the U-shaped crimp 20 above described. In this relation of the neck engaging portion 15 and bail 16, a fixed jaw 25 is provided at that portion of the bottle neck engaging portion which is fixedly attached at its ends to the ends of the bail portion 16. On the other hand, the segmental part 26 of the neck portion 15 upon the free end of which is disposed the eye 17, acts as a closure jaw, so to speak, and whereby the neck engaging portion 15 of the member B may be attached about the neck 10 of the bottle A. Thus, it can readily be seen from Figure 1 of the drawing, that the neck engaging portion 15 may accommodate the milk bottle A so that the said portion 15 is snugly disposed about the neck 10 of the bottle A, and adapted for engagement under the shoulder portion 12 thereof to facilitate transportation of the bottle A. In this relation of the device B to the bottle A, the eyed end 17 engages outwardly from the bent shoulder portion 22, and whereby the shoulder 18 engages thereagainst, to securely attach the member B to the bottle A.

Referring now to the cap extracting device D, the same is formed of a single piece of wire, and is provided upon one end with a relatively large loop 30 enclosed about the bail portion 16 of the member B and freely adjustable and movable thereabout. A relatively straight portion 31 extends from the loop 30 being of a sufficient length to effect a cap or stopper operation upon the bottle A, without detachment of the member B from the bail 16. The extreme end of the straight portion 31 is bent outwardly at an acute angle to the run thereof to provide a shoulder portion 32 having the relatively straight pointed end 33 extending outwardly therefrom, and which is preferably inclined from the shoulder portion 32 slightly toward the run of the portion 31.

In operation, the article carrying portion C is attached to the milk bottle A or other article, as above described. When it is desired to extract the cap 13 of the bottle A, the operator merely has to grasp the looped end 30 of the extractor device D, and by piercing the cap 13, and slightly moving the same, the shoulder portion 32 may engage beneath the inside surface of the cap 13 and by exerting a slight upward pull, the cap 13 will be extracted from the bottle A, and be supported upon the extractor device or member D due to the shoulder 32 which is formed thereon. The substance within the bottle A can be readily used, without detaching the extractor device D from the bail 16, since, as can readily be seen from Figure 1 of the drawings, the same supports the cap 13 from the article carrier member B, as is shown in the dotted lines.

It is to be noted that the extractor device D is permanently attached to the carrier member C by reason of the fact that the same is looped about the bail member 16, and can only travel about this bail member 16; being even retained upon the member B when the jaw portion 26 is opened, since by reason of the fixed jaw portion 25, the extractor device D cannot be detached from the member B. Thus, the cap extractor device D will always be readily accessible.

From the foregoing, it can be seen that a novel type of milk bottle carrier has been provided having a cap removing device cooperatively associated therewith.

Various changes in the shape, size and arrangement of parts to the improved device herein shown and described, may be made without departing from the spirit of the invention or the scope of the claims.

I claim:

1. In a device of the class described, the combination of an article carrying member, and a stopper extractor movably mounted upon said article carrying member whereby the same may be utilized for extracting a stopper from the article being carried, without detachment of the same from said article carrying member.

2. In a device of the class described, the combination of an article carrier including a bail portion, and a cap extracting member movably mounted upon said bail portion and adapted for cooperation therewith in extracting and supporting a cap from the article being carried.

3. A milk bottle carrier and cap extractor comprising a portion for attachment about the neck of a milk bottle and a bail portion for extension upwardly from the top of said bottle, and an extractor including a loop movably and adjustably engaging about said bail and having a cap inserting end thereon, whereby the extractor may be utilized when in its position upon the bail for cap extracting purposes.

4. In a device of the class described, the combination with a milk bottle includng a cap therefor, of a bottle carrying member adapted for engagement about the neck of said bottle and including a bail upwardly extending from the top of said bottle, and a cap extractor mounted upon said bail including a relatively large loop movably attached about said bail, and having a pointed end provided with an abrupt shoulder adjacent thereto, whereby the extractor may cooperate with the bail member to permit a turn thereof when inserting the pointed end of said extractor into a milk bottle cap, whereby the abrupt shoulder may extend to engage beneath the interior surface of the cap to permit extraction of said cap upon sliding of the extractor upwardly over the bail.

5. As an article of manufacture, a bottle cap extractor providing a straight stem portion having a pointed end in substantial alignment with said straight stem portion, said extractor upwardly of the pointed end being bent substantially at right angles to the straight stem portion to provide a cap engaging and extracting shoulder.

MIKE J. DVORSHAK.